United States Patent
Watson et al.

(10) Patent No.: US 7,981,549 B2
(45) Date of Patent: Jul. 19, 2011

(54) SEPARATOR FOR A BATTERY HAVING A ZINC ELECTRODE

(75) Inventors: Jill V. Watson, Mars, PA (US); C. Glen Wensley, Lakeland, FL (US)

(73) Assignee: Celgard Inc., Charlotte, NC (US)

( * ) Notice: Subject to any disclaimer, the term of this patent is extended or adjusted under 35 U.S.C. 154(b) by 0 days.

(21) Appl. No.: 12/834,922

(22) Filed: Jul. 13, 2010

(65) Prior Publication Data

US 2010/0279167 A1 Nov. 4, 2010

Related U.S. Application Data

(63) Continuation of application No. 10/803,710, filed on Mar. 18, 2004, now abandoned.

(51) Int. Cl.
- *H01M 2/16* (2006.01)
- *H01M 2/14* (2006.01)
- *H01M 4/13* (2006.01)

(52) U.S. Cl. ........ 429/250; 429/129; 429/247; 429/249; 429/253; 429/254; 429/223; 429/229

(58) Field of Classification Search .................. 429/129, 429/247, 250, 249, 253, 254, 223, 229
See application file for complete search history.

(56) References Cited

U.S. PATENT DOCUMENTS

| | | | |
|---|---|---|---|
| 3,811,957 | A | 5/1974 | Buntin |
| 4,298,666 | A | 11/1981 | Taskier |
| 4,359,510 | A | 11/1982 | Taskier |
| 4,438,185 | A | 3/1984 | Taskier |
| 4,544,616 | A | 10/1985 | Poa et al. |
| 6,479,190 | B1 | 11/2002 | Wensley |

OTHER PUBLICATIONS

Material Safety Data Sheet—Victawet-12 Surface Release Agent, (Oct. 27, 2005).

*Primary Examiner* — Patrick Ryan
*Assistant Examiner* — Julian Mercado
(74) *Attorney, Agent, or Firm* — Hammer & Associates, P.C.

(57) ABSTRACT

The instant invention is a separator for a battery having a zinc electrode. The battery separator according to the instant invention includes a microporous membrane, and a coating on at least one surface of the microporous membrane. The coating includes a mixture of 25-40 weight % polymer and 60-75 weight % surfactant combination. The polymer is cellulose acetate, and the surfactant combination includes a first surfactant and a second surfactant. The first surfactant, preferably, has an active ingredient selected from the group consisting of organic ethers, and the second surfactant is, preferably, an oxirane polymer with 2-ethylhexyl dihydrogen phosphate.

20 Claims, No Drawings

SEPARATOR FOR A BATTERY HAVING A ZINC ELECTRODE

RELATED APPLICATION

This is a continuation of application Ser. No. 10/803,710 filed Mar. 18, 2004, now abandoned.

FIELD OF INVENTION

The instant invention relates to a separator for a battery having a zinc electrode.

BACKGROUND OF THE INVENTION

Batteries having zinc electrodes are known. See U.S. Pat. Nos. 4,359,510; 4,438,185; and 4,544,616; Tuck, C. D. S., Editor, *Modern Battery Technology*, Ellis Horwood Limited, Chichester, England (1991); and Linden, D., Editor, *Handbook of Batteries*, Second Edition, McGraw-Hill, Inc., New York, N.Y. (1995), each of which is incorporated herein by reference. One such battery is the nickel-zinc (NiZn) battery (or cell).

The nickel-zinc (zinc/nickel oxide) battery system includes a zinc electrode, a nickel electrode, an electrolyte, and a separator. The zinc/nickel oxide battery system uses zinc as the negative active material and nickel oxide as the positive, and the electrolyte is an alkaline potassium hydroxide solution.

While NiZn cells are well known, they have never reached a significant commercial success; apparently, because of the limited effective cycle life of such batteries. Besenhard, J., Editor, *Handbook of Battery Materials*, Wiley-VCH, New York, N.Y. (1999). The reason for this limited cycle life is the high solubility of the zinc hydroxide in alkaline electrolyte; the zincate ions formed are deposited again during the subsequent charging in the form of dendrites, i.e. fernlike crystals. See Besenhard, Ibid. These dendrites grow in the direction of counter electrode and finally cause electrical shorts. See Besenhard, Ibid.

A short term remedy can be achieved by a decrease in zinc solubility in the electrolyte or by suppression of dendrite formation; cadmium-, lead-, or bismuth oxide, as well as calcium hydroxide or aluminum hydroxide have been added to the zinc electrode or the electrolyte to suppress dendrite formation. See Besenhard, Ibid. However, this remedy does not have long-lasting effectiveness. See Besenhard, Ibid.

It has also been suggested that microporous films could be used to overcome the problems associated with the use of zinc electrodes. See Tuck, Ibid., Linden, Ibid., and U.S. Pat. Nos. 4,359,510; 4,438,185; and 4,544,616.

One commercially available microporous membrane for use in batteries having zinc electrodes is Celgard® 3406 microporous membrane. See: U.S. Pat. Nos. 4,359,510 and 4,438,185. Celgard® 3406 is a microporous membrane having a polymer coating on one surface. The microporous membrane is commercially available as Celgard® 2400 microporous membrane, a polypropylene microporous membrane having an average pore size of about 0.045 microns. The polymer coating consists of cellulose acetate and a surfactant commercially available as VICTAWET® 12 wetting agent. VICTAWET® 12, an oxirane polymer with 2-ethylhexyl dihydrogen phosphate, is commercially available from Akzo Chemicals, Inc., Chicago, Ill. While Celgard 3406 performs adequately, it has a limited shelf life (about 9 months from the coating date) and it wets only once (i.e., the surfactant readily washes off).

Another commercially available microporous membrane for use in batteries having zinc electrodes is Celgard® 3407 coated microporous membrane. See: U.S. Pat. No. 6,479,190. Celgard® 3407, which is commercially available from Celgard, Inc. of Charlotte, N.C., comprises a microporous membrane having a coating on at least one surface of the membrane. Celgard® 3407 microporous membrane, having an average pore size of about 0.045 microns, is typically a hydrophobic, polyolefinic polymer. The coating consists of cellulose acetate and a surfactant, which has an active ingredient selected from the group consisting of organic ethers. The surfactant is commercially available as IGEPAL CO-530 from Rhone-Poulenc of Cranbury, N.J. Although Celgard® 3407 has furnished design improvements to overcome the limited cycle life performance of the nickel-zinc batteries, Celgard® 3407 has an electrical resistance of less than 20 milliohms-inch$^2$, and it may take up to 100 seconds to wet in aqueous electrolytes after 12 months of storage.

Accordingly, there is a need for an improved separator for a battery having a zinc electrode, which has a greater shelf life, i.e. a greater re-wet capability, and a lower electrical resistance.

SUMMARY OF THE INVENTION

The instant invention is a separator for a battery having a zinc electrode. The battery separator according to the instant invention includes a microporous membrane, and a coating on at least one surface of the microporous membrane. The coating includes a mixture of 25-40 weight % polymer and 60-75 weight % surfactant combination. The polymer is cellulose acetate, and the surfactant combination includes a first surfactant and a second surfactant. The first surfactant, preferably, has an active ingredient selected from the group consisting of organic ethers, and the second surfactant is, preferably, an oxirane polymer with 2-ethylhexyl dihydrogen phosphate.

DETAILED DESCRIPTION OF THE INVENTION

The instant invention is directed to a separator for a battery having a zinc electrode. Those batteries are typically secondary (i.e., rechargeable) batteries. Such batteries may be nickel-zinc or silver-zinc batteries. To facilitate the following discussion, the battery discussed in detail will be a nickel-zinc (zinc/nickel oxide) battery. The invention, however, is not so limited.

The chemistry of zinc/nickel oxide batteries is well known. See: Tuck, Ibid., Linden, Ibid., and Besenhard, Ibid. all of which are incorporated herein by reference.

The zinc/nickel oxide battery system, typically, includes a zinc electrode, a nickel electrode, an electrolyte, and a separator. Typically, the electrodes sandwich the separator, and the electrolyte communicates with the two electrodes via the separator.

The zinc electrode is the anode or the negative electrode. The anode is the reducing or fuel electrode; thus, the zinc electrode gives up electrons to the external circuit and becomes oxidized during an electrochemical reaction. Zinc electrodes may be made from metallic zinc. Typically, zinc electrodes are designed to be 60-70% porous in their all-metallic state.

The nickel electrode is the cathode or the positive electrode. The cathode is the oxidizing electrode; thus, the nickel electrode accepts electrons from the external circuit and becomes reduced during an electrochemical reaction. The nickel electrode is, typically, made from nickel oxide.

The electrolyte is, typically, an ionic conductor, which provides the medium for transfer of electrons, as ions, inside a cell between the anode and the cathode. The electrolyte is typically a liquid, such as water or other solvent, with dissolved salts, acids, or alkalis to impart ionic conductivity. However, the electrolyte may be a solid electrolyte, which is an ionic conductor at the operating temperature of the cell. An example of electrolyte in zinc/nickel oxide battery system includes, but is not limited to, an aqueous potassium hydroxide (KOH) solution, where the potassium hydroxide concentration ranges from about 20 to 45 percent by weight.

The separator according to instant invention comprises a microporous membrane, and a coating on at least one surface of the membrane.

The microporous membrane is typically a hydrophobic, polyolefinic polymer. The hydrophobic, polyolefinic polymers include, for example, polyethylene and polypropylene, the latter is preferred. The method of manufacturing the membrane is not critical, and may include, for example, the "dry" stretch (or Celgard) process or the "solvent" stretch (or phase inversion) process. Such membranes may have a thicknesses less than 3 mils (about 75 microns), preferably less than 1.5 mils (38 microns), and most preferably a thickness of about 1 mil (25 microns). The membrane may have an average pore size of about 0.045±0.002 micron, a porosity of 28-40%, and a Gurley of 20-45 sec/inch$^2$. Such membranes are commercially available from, for example, Celgard Inc., Charlotte, N.C., U.S.A.; Tonen K.K., Tokyo, Japan; Asahi Chemical Co., Tokyo, Japan; Ube Industries, Tokyo, Japan; and Nitto Denko Corporation, Tokyo, Japan.

The coating comprises a polymer and a surfactant combination. The coating is applied to at least one surface of a microporous membrane. Preferably, the coating is applied to both surfaces of a microporous membrane. If the coating is applied to both surfaces of a microporous membrane, the coating may have surface density in the range of about 0.30 to 0.43 mg/cm$^2$, and preferably, the coating may have a surface density in the range of 0.31 to 0.38 mg/cm$^2$. The coating is preferably applied in solution and the solvent (e.g., acetone or methylethyl ketone) is driven off in any known manner.

The polymer may be selected from the group consisting of cellulose acetate. The optimum amount of cellulose acetate is an amount which is sufficient to coat both surfaces of a microporous membrane creating the sieve effect (i.e. ability to selectively pass/reject molecules based upon size) when wetted; however, too much cellulose acetate will block the pores of the microporous membrane, and it will increase its electrical resistance. If the coating is applied to both surfaces of a microporous membrane, the cellulose acetate may have a surface density in the range of about 0.10 to 0.13 mg/cm$^2$. Cellulose acetate (which has about 2.5 acetyl groups per glucose, e.g. CA-398-3)) is a commercially available material from, for example, Celanese Acetate LLC of Charlotte, N.C., U.S.A.; or Eastman Chemical Co. of Kingsport, Tenn., U.S.A. Celanese cellulose acetate HB-105 is preferred.

The surfactant combination, as used herein, comprises a first surfactant and a second surfactant. The optimum amount of surfactant combination is a sufficient amount thereof to wet in aqueous electrolyte in a short period of time; however, too much surfactant combination will block the pores of the microporous membrane, and it will increase its electrical resistance. If the coating is applied to both surfaces of a microporous membrane, the surfactant combination may have a surface density in the range of 0.20 to 0.30 mg/cm$^2$, and preferably, the surfactant combination may have a surface density of 0.25 mg/cm$^2$. First surfactant and second surfactant, with respect to each other, may have any weight ratios. Preferably, first surfactant and second surfactant have a weight ratio of 1:3 or 3:1, respectively, and most preferably, first surfactant and second surfactant have a weight ratio of 1:1.

With regard to the first surfactant, three considerations help define the selection criteria, those considerations are: 1) first surfactant must be inert to the electrolyte (e.g. non-hydrolyzable in the electrolyte); 2) first surfactant should not be soluble or readily soluble in the electrolyte; and 3) first surfactant should be adherent to the membrane.

With regard to the second surfactant, two considerations help define the selection criteria, those considerations are: 1) second surfactant must be inert to the electrolyte (e.g. non-hydrolyzable in the electrolyte); 2) second surfactant must increase the wetting speed and stability of the membrane without interfering with long term membrane storage life.

First surfactant may have an active ingredient selected from the group consisting of organic ethers. One example of the organic ether is nonylphenoxypoly (ethyleneoxy) ethanol. One such surfactant is commercially available under the tradename IGEPAL CO-530 from Rhone-Poulenc of Cranbury, N.J., U.S.A. If the coating is applied to both surfaces of a microporous membrane, the first surfactant may have a surface density in the range of 0.10 to 0.20 mg/cm$^2$. Preferably, the first surfactant may have a surface density in the range of 0.10 to 0.15 mg/cm$^2$, and most preferably, the first surfactant may have a surface density of 0.125 mg/cm$^2$.

Second surfactant may be an oxirane polymer with 2-ethylhexyl dihydrogen phosphate. One such surfactant, meeting the foregoing criteria, is VICTAWET® 12 wetting agent. VICTAWET® 12 is commercially available from Akzo Chemicals, Inc., Chicago, Ill. If the coating is applied to both surfaces of a microporous membrane, the second surfactant may have a surface density in the range of 0.10 to 0.20 mg/cm$^2$. Preferably, the second surfactant may have a surface density in the range of 0.10 to 0.15 mg/cm$^2$, and most preferably, the second surfactant may have a surface density of 0.125 mg/cm$^2$.

The freshly coated separator according to instant invention may have any electrical resistance. Preferably, the freshly coated separator according to instant invention has an electrical resistance of less than 10.4 milliohms-inch$^2$, and most preferably, an electrical resistance in the range of about 9.9 to 10.4 milliohms-inch$^2$. Furthermore, the coated separator according to instant invention, stored for a period not less than 22 days and not exceeding 256 days at 70° C., may have any electrical resistance. In addition, preferably, the coated separator according to instant invention, stored for a period not less than 22 days and not exceeding 256 days at 70° C., has an electrical resistance of less than 10 milliohms-inch$^2$, and most preferably, an electrical resistance in the range of about 7.7 to 10 milliohms-inch$^2$. Electrical resistance ("ER") of a microporous film as defined herein and employed in the claims is determined by soaking a sample thereof having a known surface area (e.g., 1.0 sq. inches) in about a 30% by weight, solution of KOH in water for 24 hours. The resulting sample is then disposed between working platinum electrodes (i.e., anode and a cathode) immersed in an electrolyte of a 30%, by weight, solution of KOH in water and a direct current of known amperage (e.g., 40 milliamperes) is passed through the cell between the electrodes. The potential drop across the film (E') is measured with an electrometer. The potential drop across the cell without the microporous film disposed therein (E) is also determined using the same current. E is measured in millivolts. The electrical resistance of the microporous film is then determined using the equation:

$$ER=((E'-E)A)/I$$

where A is the surface area of the exposed film in square inches, I is the current across the cell in milliamperes, ER is the electrical resistance of the microporous film in milliohms-inch$^2$, and E' and E are as described above.

The coated separator may have a thickness of less than 3 mils (75 microns), and preferably, a thickness of less than or equal to 1.5 mils.

The freshly coated separator according to instant invention may be capable of wetting in less than 8 seconds. Furthermore, the coated separator according to instant invention, stored for a period not less than 22 days and not exceeding 256 days at 70° C., is capable of wetting in one second, and preferably, it is capable of wetting almost instantaneously.

The effective average pore size of the coated separator should be less than 0.045 micron, preferably in the range of about 0.030 to 0.040 micron, and most preferably less than 0.035 micron. An effective average pore size which is too large will adversely impact cycle life because too many zincate ions will pass through the separator, and if too low, it will adversely impact conductivity within the cell, because electrical resistance will be too great. The effective average pore size refers to the apparent pore size exhibited by the coated membrane when wet out by the electrolyte. Effective average pore size is measured by solute passage method. See for example: Cheryan, M., *Ultrafiltration Handbook*, Technomic Publishing Co., Lancaster, Pa., (1986) p. 62-71. The pore size of a membrane was estimated to be 0.035 micron (35 nm) by the foregoing method using: myoglobulin-17,600 molecular weight (MW), 3.7 nanometers (nm) size, 0% rejection; lactoglobulin-38,000 MW, 5.2 nm, 10%; albumin-69,000 MW, 6.4 nm, 30%; serum globulin-148,000 MW, 9.2 nm, 75%; haemocyanine (Palinurus)-450,000 MW, 11.7 nm, 90%.

EXAMPLES

The separator made according to instant invention was compared to the commercially available products, i.e. Celgard® 3407 microporous membrane and Celgard® 3406 microporous membrane at 70° C. The comparative analysis included six separator samples. Coating solution of sample 1 (3407 control), as shown in Table I, included, on a weight of a solvent basis, 1.75% cellulose acetate, 4% IGEPAL CO-530, and 0% VICTAWET-12. Coating solution of sample 2, as shown in Table I, included, on a weight of a solvent basis, 1.75% cellulose acetate, 3.5% IGEPAL CO-530, and 0.5% VICTAWET-12. Coating solution of sample 3, as shown in Table I, included, on a weight of a solvent basis, 1.75% cellulose acetate, 3.0% IGEPAL CO-530, and 1.0% VICTAWET-12. Coating solution of sample 4, as shown in Table I, included, on a weight of a solvent basis, 1.75% cellulose acetate, 2.0% IGEPAL CO-530, and 2.0% VICTAWET-12. Coating solution of sample 5, as shown in Table I, included, on a weight of a solvent basis, 1.75% cellulose acetate, 1.0% IGEPAL CO-530, and 3.0% VICTAWET-12. Coating solution of sample 6 (3406 control), as shown in Table I, included, on a weight of a solvent basis, 1.75% cellulose acetate, 0% IGEPAL CO-530, and 7% VICTAWET-12. The comparative results are set out hereinbelow in Table II and Table III. Table II shows the electrical resistance ("ER"), measured in milliohms-inch$^2$, of the abovementioned samples after 0 days, 22 days, 48 days, 104 days, 122 days, and 256 days of storage at 70° C. Table III shows the wettability ("W"), measured in seconds, of the abovementioned samples after 0 days, 22 days, 48 days, 104 days, 122 days, and 256 days of storage at 70° C.

TABLE I

| Sample # | CA % | IGEPAL % | VICTAWET-12% | Acetone % |
|---|---|---|---|---|
| #1 | 1.75% | 4% | 0% | 94.25% |
| #2 | 1.75% | 3.5% | 0.5% | 94.25% |
| #3 | 1.75% | 3% | 1% | 94.25% |
| #4 | 1.75% | 2% | 2% | 94.25% |
| #5 | 1.75% | 1% | 3% | 94.25% |
| #6 | 1.75% | 0% | 7% | 91.25% |

TABLE II

| Sample | ER-0 Days (milliohms-inch$^2$) | ER-22 Days (milliohms-inch$^2$) | ER-48 Days (milliohms-inch$^2$) | ER-104 Days (milliohms-inch$^2$) | ER-122 Days (milliohms-inch$^2$) | ER-256 Days (milliohms-inch$^2$) |
|---|---|---|---|---|---|---|
| #1 | 15.6 | 17.8 | 18.4 | 18.7 | 18.5 | 15.1 |
| #2 | 13.9 | — | 20.6 | 19.9 | 21.6 | 18.9 |
| #3 | 10.4 | 15.9 | 19.6 | 16 | 15.9 | 12.2 |
| #4 | 9.9 | 10.9 | 11.8 | 11.7 | 10.1 | 7.7 |
| #5 | 10.3 | 9.8 | 11.5 | 11.1 | 9.0 | 8.6 |
| #6 | 6.2 | 173.2 | 62.1 | 219.7 | >1000 | — |

TABLE III

| Sample # | W-0 Days (Sec) | W-22 Days (Sec) | W-48 Days (Sec) | W-104 Days (Sec) | W-122 Days (Sec) | W-256 Days (Sec) |
|---|---|---|---|---|---|---|
| #1 | 21 | — | 57 | 55 | — | 91 |
| #2 | 12.3 | 1 | 1 | 4 | 3 | Instantaneous |
| #3 | 12 | 1 | 1 | 1 | 1 | Instantaneous |
| #4 | 8 | 1 | 1 | 1 | 1 | Instantaneous |
| #5 | 7 | 1 | 1 | 1 | 1 | Instantaneous |
| #6 | 5 | Not wet to clear | Not wet to clear | Did not wet | — | — |

The present invention may be embodied in other forms without departing from the spirit and the essential attributes thereof, and, accordingly, reference should be made to the appended claims, rather than to the foregoing specification, as indicated the scope of the invention.

We claim:

1. A battery separator for a nickel-zinc battery comprising:
a microporous membrane comprising a microporous hydrophobic, polyolefinic polymer film having a thickness of less than 1.5 mils and having an effective average pore size of less than 0.045 micron; and
a coating of cellulose acetate and a surfactant combination on at least one surface of said membrane and having a surface density in the range of 0.30 to 0.43 mg/cm$^2$, said coating comprising a mixture of 25-40 weight % of the cellulose acetate and 60-75 weight % of the surfactant combination comprising a first surfactant having an active ingredient selected from the group consisting of organic ethers and a second surfactant being an oxirane polymer with 2-ethylhexyl dihydrogen phosphate, said cellulose acetate having about 2.5 acetyl groups per glucose, and
the separator having an electrical resistance of $\leq 21.6$ m$\Omega$-in$^2$ and being wetted within 3 seconds or less.

2. The separator according to claim 1, wherein said first surfactant and said second surfactant having a 1:1 weight ratio.

3. The separator according to claim 1, wherein said first surfactant and said second surfactant having a 1:3 weight ratio.

4. The separator according to claim 1, wherein said first surfactant and said second surfactant having a 3:1 weight ratio.

5. The separator according to claim 1, wherein said coating being on both surfaces of said membrane.

6. The separator according to claim 5, wherein said coating having a surface density in the range of 0.31 to 0.38 mg/cm$^2$.

7. The separator according to claim 1, wherein said separator being stored for a period not less than 22 days and not exceeding 256 days at 70° C., and said separator having an electrical resistance of $\leq 10$ milliohms-inch$^2$.

8. The separator according to claim 1, wherein said separator being stored for a period not less than 22 days and not exceeding 256 days at 70° C., and said separator having an electrical resistance in the range of 7.7 to 10 milliohms-inch$^2$.

9. The separator according to claim 1, wherein said separator being stored for a period not less than 22 days and not exceeding 256 days at 70° C., and said separator being wetted within 1 second or less by an aqueous electrolyte.

10. The separator according to claim 1, wherein said first surfactant being a nonylphenoxypoly (ethyleneoxy) ethanol.

11. The separator according to claim 1, wherein said polyolefinic polymer is polypropylene.

12. A nickel-zinc battery comprising:
a first electrode;
a second electrode;
an electrolyte; and
a separator, said separator being disposed between said first electrode and said second electrode and said electrolyte being in communications with said electrodes via said separator,
said separator comprises
a microporous membrane comprising a microporous hydrophobic, polyolefinic polymer film having a thickness of less than 1.5 mils and having an effective average pore size of less than 0.045 micron, and
a coating of cellulose acetate and a surfactant combination on at least one surface of said membrane and having a surface density in the range of 0.30 to 0.43 mg/cm$^2$, said coating comprising a mixture of 25-40 weight % of the cellulose acetate and 60-75 weight % of the surfactant combination comprising a first surfactant having an active ingredient selected from the group consisting of organic ethers and a second surfactant being an oxirane polymer with 2-ethylhexyl dihydrogen phosphate, said cellulose acetate having about 2.5 acetyl groups per glucose, and
the separator having an electrical resistance of $\leq 21.6$ m$\Omega$-in$^2$ and being wetted within 3 seconds or less.

13. The battery according to claim 12, wherein said first surfactant being a nonylphenoxypoly (ethyleneoxy) ethanol.

14. The battery according to claim 12, wherein said first surfactant and said second surfactant having a 1:1 weight ratio.

15. The battery according to claim 12, wherein said first surfactant and said second surfactant having a 1:3 weight ratio.

16. The separator according to claim 12, wherein said first surfactant and said second surfactant having a 3:1 weight ratio.

17. The battery according to claim 12, wherein said coating being on both surfaces of said membrane.

18. The battery according to claim 17, wherein said coating having a surface density in the range of 0.31 to 0.38 mg/cm$^2$.

19. The battery according to claim 12, wherein said separator being stored for a period not less than 22 days and not exceeding 256 days at 70° C., and said separator having an electrical resistance of $\leq 10$ milliohms-inch$^2$.

20. The battery according to claim 12, wherein said separator being stored for a period not less than 22 days and not exceeding 256 days at 70° C., and said separator being wetted within 1 second or less by an aqueous electrolyte.

* * * * *